(12) United States Patent
Vaugn

(10) Patent No.: US 6,832,581 B1
(45) Date of Patent: Dec. 21, 2004

(54) INHALATION NET FOR DOGS

(76) Inventor: Eric Douglas Vaugn, 935 Pepper Rd., Petaluma, CA (US) 94952

( * ) Notice: Subject to any disclaimer, the term of this patent is extended or adjusted under 35 U.S.C. 154(b) by 0 days.

(21) Appl. No.: 10/310,480

(22) Filed: Dec. 4, 2002

(51) Int. Cl.[7] .............................................. A01K 25/00
(52) U.S. Cl. ........................ 119/850; 119/832; 119/834
(58) Field of Search ................................ 119/850, 831, 119/832, 834; 54/80.3, 80.5; D30/152

(56) References Cited

U.S. PATENT DOCUMENTS

| | | | | |
|---|---|---|---|---|
| 1,311,933 A | * | 8/1919 | Weigel | 54/80.3 |
| 3,609,941 A | * | 10/1971 | Eldredge | 54/80.3 |
| 4,519,187 A | * | 5/1985 | Reynolds | 54/80.3 |
| 4,566,255 A | * | 1/1986 | DeGroot | 54/24 |
| 4,838,206 A | * | 6/1989 | Anderson et al. | 119/831 |
| 5,136,984 A | * | 8/1992 | Askinasi | 119/831 |
| 5,159,720 A | * | 11/1992 | Scott, Jr. | 2/171 |
| 5,218,929 A | * | 6/1993 | Michunovich | 119/832 |
| 5,226,189 A | * | 7/1993 | Blutstein | 2/4 |
| 5,299,531 A | * | 4/1994 | Dietz | 119/832 |
| 5,540,189 A | * | 7/1996 | Masson | 119/850 |
| 5,762,030 A | * | 6/1998 | Paglericcio et al. | 119/831 |
| 5,794,420 A | * | 8/1998 | Fine | 54/80.3 |
| 5,842,231 A | * | 12/1998 | Dawes | 2/202 |
| 6,119,633 A | * | 9/2000 | Berke et al. | 119/822 |
| 6,128,891 A | * | 10/2000 | McMahon | 54/80.1 |
| 6,382,140 B2 | * | 5/2002 | Wexler | 119/837 |

* cited by examiner

Primary Examiner—Yvonne R. Abbott
(74) Attorney, Agent, or Firm—Risto A. Rinne, Jr.

(57) ABSTRACT

An apparatus for the prevention of a dog from inhaling a weed seed includes a collar assembly that secures the apparatus around the neck of a dog and is adjustable in length. A snout assembly includes a pair of side plates that are disposed in a parallel spaced-apart orientation on either side of a snout of a dog. A mesh is disposed intermediate at least a portion of the side plates so that the mesh is disposed over a nose portion of the snout of the dog when the apparatus is worn by the dog. The mesh prevents the dog from inhaling certain weed seeds, for example, a foxtail seed through its nostrils and into its nose.

19 Claims, 1 Drawing Sheet

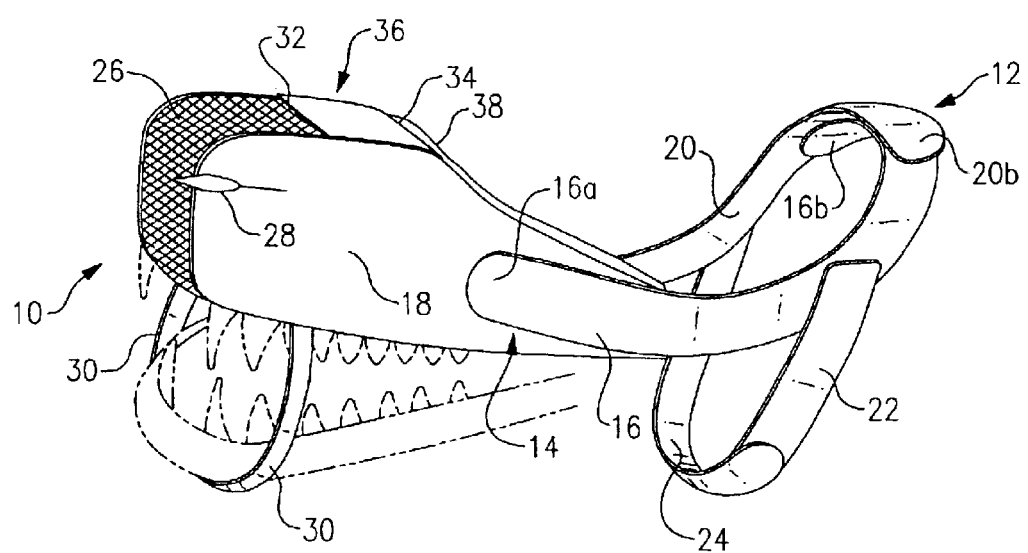

INHALATION NET FOR DOGS

BACKGROUND OF THE INVENTION

1. Field of the Invention

The present invention, in general relates to dogs and, more particularly, to devices that prevent dogs from inhaling certain deleterious objects.

Dogs sniff the ground when they walk outside. There are certain weed seeds that, if inhaled, pose significant health risks for dogs.

Chief among these is the foxtail seed. If inhaled in a particular manner, the seed can pass into one of the dog's nostrils where it presents profound discomfort to the animal. The dog may sneeze and contort itself but is usually unable to dislodge the foxtail seed because of its construction. The foxtail seed contains a number of angled elements that permit passage in a first direction but which engage with the dog's nostril to prevent passage in a second opposite direction.

Therefore, the dog cannot sneeze or otherwise remove the seed. A trip to the veterinarian is then warranted. Depending upon how far into the nostril the foxtail seed has passed will determine the procedure that is required to remove it. The dog is typically either sedated or anesthetized and instrumentation is used to extract the foxtail seed, often at substantial expense. The exact procedure varies depending on the location of the seed and also on the temperament of the dog.

In some instances, the seed will actually be inhaled into the lung. This poses a significant health risk due to infection and other possible complications and it can endanger the life of the dog. Any foxtail seed that is not removed, even if in the nostril and not the lung, can endanger the life of the dog.

Dogs may repeatedly inhale foxtail seeds during such times as when they are abundant in the environment. Therefore, this problem can occur repeatedly.

There are various other types of weed seeds that present similar problems if inhaled by the dog.

Accordingly there exists today a need for an inhalation net for dogs that helps to prevent the inhalation of troublesome seeds by dogs.

Clearly, such an apparatus would be a useful and desirable device.

2. Description of Prior Art

Muzzles appear similar and are, in general, known. For example, the following patents describe various types of these devices:

U.S. Pat. No. 6,382,140 to Wexler, May 7, 2002;
U.S. Pat. No. 6,227,148 to Wexler, May 8, 2001;
U.S. Pat. No. 6,082,309 to Wexler, Jul. 4, 2000;
U.S. Pat. No. 5,299,531 to Dietz, Apr. 5, 1994;
U.S. Pat. No. 4,273,119 to Marchello, Jun. 16, 1981; and
U.S. Design Pat. No. D316,764 to Edwards, May 7, 1991.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide an inhalation net for dogs that helps prevent a dog from inhaling an object.

It is also an important object of the invention to provide an inhalation net for dogs that helps prevent a dog from inhaling a weed seed.

Another object of the invention is to provide an inhalation net for dogs that helps prevent a dog from inhaling a foxtail weed seed.

Still another object of the invention is to provide an inhalation net for dogs that is inexpensive to manufacture.

Still yet another object of the invention is to provide an inhalation net for dogs that includes a mesh netting or screen that prevents weed seeds from passing through the mesh.

Yet another important object of the invention is to provide an inhalation net for dogs that is adapted to fit over a portion of the snout of a dog.

Still yet another important object of the invention is to provide an inhalation net for dogs that is adapted to fit over the nose portion of the snout of a dog.

Still yet another important object of the invention is to provide an inhalation net for dogs that allows the dog to eat and drink while wearing the net.

Briefly, an inhalation net for dogs that is constructed in accordance with the principles of the present invention has a collar assembly and a snout assembly. The collar assembly secures around the neck of the dog and the snout assembly is detachably attached to the collar assembly. Both the collar assembly and the snout assembly are adjustable to fit the dog. The snout assembly includes a mesh portion that is adapted to cover the nose of the dog. During use, the dog is able to eat, drink, bark, even bite, yet it is prevented from inhaling a weed seed through its nose.

BRIEF DESCRIPTION OF THE DRAWINGS

The drawing FIGURE is a view in perspective of an inhalation net for dogs.

DETAILED DESCRIPTION OF THE INVENTION

Referring to all of the FIGURE drawing is shown, a dog inhalation net, identified in general by the reference numeral 10.

The dog inhalation net 10 includes an adjustable collar assembly, identified in general by the reference numeral 12. A snout assembly, identified in general by the reference numeral 14, is adapted to fit over a nose portion of a snout of a dog (the lower jaw portion of the snout shown in dashed lines).

The rest of the dog's head and snout are not shown but their location is deemed obvious after a reading of the specification of the instant invention.

The collar assembly 12 includes a first side strap 16 that is secured at a first end 16a thereof to a first side plate 18 of the snout assembly 14 by the use of a hook and loop fastener, such as that sold under the tradename of VELCRO. A corresponding half (i.e., either the hook or the loop portion) is attached to the exterior of the first side plate 18 and a corresponding remaining half is attached to the inside portion of the first side strap 16 proximate the first end 16a thereof.

The location of the first end 16a with respect to the first side plate 18 is thereof adjustable depending upon where the first end 16a is placed in contact with the first side plate 18, to which it adheres until pulled apart. This adjustment is useful to accommodate different sizes of dog heads and in particular different sizes of snouts.

A second side strap 20 is similarly attached to a second side plate (not shown) that is disposed in a parallel spaced-apart relationship with respect to the first side plate 18. The dog's snout (nostrils and top of jaw) are placed between the first and second side plates 18. The first and second side straps 16, 20 each include an opposite end 16b, 20b that are each disposed at an opposite end of the side straps 16, 20 with respect to their respective first ends 16a, 20a.

Intermediate the first and second ends 16a, 16b, 20a, 20b of each side strap 16, 20 is an arcuate portion where each side strip 16, 20 curves up and over the dog's neck, behind its head.

The second ends 16b, 20b each also include a portion of a respective half of hook and loop fastener so that when pressed together they adhere. Accordingly, the combined overall length of the side straps 16, 20 is also adjustable. This contributes to allow the inhalation net for dogs 10 to properly fit various sizes of heads that each dog possesses. Of course, if the dog is especially large or small, the overall size of the inhalation net 10 is adjusted, as required.

Attached at one end to each side strap 16, 20 proximate the seconds ends thereof 16b, 20b is a first lower collar portion 22 and a second lower collar portion 24. At an end of each that is opposite the one end, the first and second lower collar portions 22, 24 also include corresponding halves of a hook and loop fastener attached to each.

Accordingly, the overall length of a loop that is formed by the first and second lower collar portions 22, 24 and the remaining portions of the side straps 16, 20 that are located proximate their second ends 16b, 20b is adjustable to fit around the neck of the dog.

A band of mesh 26 is placed intermediate the first 18 and second side plates. The mesh 26 must pass over a front of the side plates 18 that is disposed over the nose portion of the dog when the dog is wearing the inhalation net for dogs 10.

The mesh 26 includes any type of a fabric or nylon mesh, netting, or screen formed of any desired material that allows the free passage of air (so the dog can breathe normally without impact to its sense of smell) yet the mesh 26 must prevent weed seeds from passing through the mesh 26 and possibly being inhaled into the lungs of the dog.

If the mesh 26 is too fine so that it blocks dust it restricts air intake and the dog becomes winded and tired if breathing through its nose. If the mesh 26 is too course weed seeds can pass through.

A preferred range of the mesh 26 includes openings that include a diameter or spacing that exceeds ¹⁄₆₄th of an inch but is less than ¹⁄₃₂nd of an inch. This is sufficient to prevent a foxtail seed 28 from being inhaled.

An elastic strap 30 is passed under the lower jaw of the dog. The elastic strap 30 retains the inhalation net for dogs 10 in its proper position with the mesh 26 disposed over and covering the nose.

The elastic strap 30 also allows the dog to open its mouth. This is especially useful when the dog is outside and allowed to run and exercise. The dog is able to drink, bark when it wishes, even eat food. The dog could even bite if it had to in order to protect itself or if it is a trained guard dog, for example, to protect property or lives from various threats. Also by opening its mouth, the dog can inhale through its mouth if it needs a large quantity of air, such as during strenuous exercise.

The mesh 26 is disposed primarily at the front (near the nose) of the dog. Intermediate the two side plates 18 extending from a first location 32 to a second location 34 is a solid top 36. The solid top 36 is disposed along the top of the net 10 until the side plates 18 experience a tapering in height as they approach the collar assembly 12.

From the second location 34 back to the top end of the side plates 18, a soft lining is provided intermediate the side plates 18. This is more comfortable for the sensitive area of the dog's snout.

In summary, the dog is able to function normally when wearing the inhalation net for dogs 10. The dog is also prevented from inhaling weed seeds that could irritate, infect, or possibly even prove fatal.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

For example, a modified net could be provided that fully surrounds the dogs snout, if preferred, providing it included the preferred range of netting size.

What is claimed is:

1. An inhalation net for dogs, comprising:
   (a) a collar assembly; and
   (b) a snout assembly, wherein said snout assembly is secured to said collar assembly and wherein said snout assembly includes a mesh that is adapted to be disposed over a nose of a dog and wherein said mesh provides a covering over said nose that prevents said dog from inhaling a weed seed through said mesh and into said nose of said dog, and wherein said snout assembly includes a pair of side plates that are disposed in a parallel spaced-apart relationship with respect to each other and are adapted to be disposed on opposite sides of the snout of a dog; and
   wherein said dog is able to open a lower portion of its jaw sufficient to allow it to drink, eat, or bite.

2. The inhalation net for dogs of claim 1 wherein said mesh includes a fabric mesh.

3. The inhalation net for dogs of claim 1 wherein said mesh includes a nylon mesh.

4. The inhalation net for dogs of claim 1 wherein said mesh includes a size that is greater than one-sixty-fourth of an inch from side to side.

5. The inhalation net for dogs of claim 1 wherein said mesh includes a size that is less than one-thirty-second of an inch from side to side.

6. The inhalation net for dogs of claim 1 wherein said mesh includes a size that is greater than one-sixty-fourth of an inch from side to side and is less than one-thirty-second of an inch from side to side.

7. The inhalation net for dogs of claim 1 wherein said collar assembly is adapted to fit around the neck of a dog sufficient to secure said inhalation net to said dog.

8. The inhalation net for dogs of claim 1 wherein said collar assembly includes means for adjusting its overall length.

9. The inhalation net for dogs of claim 8 wherein said means for adjusting includes a hook and loop fastener.

10. The inhalation net for dogs of claim 1 wherein said collar assembly includes means for fastening said collar assembly to said snout assembly.

11. The inhalation net for dogs of claim 10 wherein said means for fastening includes a hook and loop fastener.

12. The inhalation net for dogs of claim 1 wherein said mesh is disposed intermediate said pair of side plates at a front of said pair of side plates sufficient to cover a nose of said dog.

13. The inhalation net for dogs of claim 12 including a top plate that is disposed intermediate said side plates and adjacent to said mesh at one end thereof.

14. The inhalation net for dogs of claim 13 including a liner that is disposed intermediate said side plates and adjacent to said top plate at one end thereof.

15. The inhalation net for dogs of claim 1 including means for retaining said net proximate said snout of said dog.

16. The inhalation net for dogs of claim 15 wherein said means for retaining includes an elastic strap that is attached at each end thereof to one of said two side plates.

17. The inhalation net for dogs of claim 1 wherein said lower portion of its jaw includes a mandible of said dog.

18. A method for improving the quality of air that is inhaled by a dog, comprising the steps of:

(a) providing an inhalation net for dogs, comprising:
  (1) a collar assembly; and
  (2) a snout assembly, wherein said snout assembly is secured to said collar assembly and wherein said snout assembly includes a mesh that is adapted to be disposed over a nose of a dog and wherein said mesh provides a covering over said nose that prevents said dog from inhaling a weed seed through said mesh and into said nose of said dog, and wherein said snout assembly includes a pair of side plates that are disposed in a parallel spaced-apart relationship with respect to each other and are adapted to be disposed on opposite sides of the snout of a dog; and wherein said dog is able to open a lower portion of its jaw sufficient to allow it to drink, eat, or bite; and (b) placing said mesh of said inhalation net over said nose of said dog.

19. The method of claim 18 including the step of securing said inhalation net to a snout of said dog sufficient to retain said mesh over said nose.

* * * * *

UNITED STATES PATENT AND TRADEMARK OFFICE
CERTIFICATE OF CORRECTION

PATENT NO.    : 6,832,581 B1
DATED         : December 21, 2004
INVENTOR(S)   : Eric Douglas Vaughn It is certified that error appears in the above-identified patent and that said Letters Patent is hereby corrected as shown below:

Title page,
Item [75], Inventors, please change name from "Eric Douglas Vaugn" to -- Eric Douglas Vaughn --.

Signed and Sealed this

Tenth Day of May, 2005

JON W. DUDAS
*Director of the United States Patent and Trademark Office*